United States Patent [19]
Woog et al.

[11] Patent Number: 5,630,144
[45] Date of Patent: May 13, 1997

[54] DESKTOP COMPUTER MONITOR POWER CONTROL USING KEYBOARD CONTROLLER

[75] Inventors: Kenneth M. Woog, El Toro; Tony Casano, Felton; Mark Caradori, Milpitas, all of Calif.

[73] Assignee: Phoenix Technologies Ltd., Santa Clara, Calif.

[21] Appl. No.: 384,350

[22] Filed: Feb. 2, 1995

Related U.S. Application Data

[63] Continuation of Ser. No. 20,292, Feb. 19, 1993, abandoned.
[51] Int. Cl.$^6$ .................................................. G06F 1/32
[52] U.S. Cl. ................................................... 395/750
[58] Field of Search ............................ 395/750; 364/707

[56] References Cited

U.S. PATENT DOCUMENTS

| | | | |
|---|---|---|---|
| 4,285,043 | 8/1981 | Hashimoto et al. | 364/707 |
| 4,317,181 | 2/1982 | Teza et al. | 364/707 |
| 4,365,290 | 12/1982 | Nelms et al. | 364/200 |
| 4,649,373 | 3/1987 | Bland et al. | 340/365 |
| 4,698,748 | 10/1987 | Juzswik et al. | 395/750 |
| 4,841,440 | 6/1989 | Yonezu et al. | 395/275 |
| 4,851,987 | 7/1989 | Day | 395/550 |
| 5,041,964 | 8/1991 | Cole et al. | 395/425 |
| 5,083,266 | 1/1992 | Watanabe | 395/750 |
| 5,167,024 | 11/1992 | Smith et al. | 395/375 |
| 5,214,785 | 5/1993 | Fairweather | 395/800 |
| 5,237,692 | 8/1993 | Raasch et al. | 395/725 |
| 5,249,298 | 9/1993 | Bolan et al. | 395/750 |
| 5,283,906 | 2/1994 | Chen | 395/750 |
| 5,347,167 | 9/1994 | Singh | 395/750 |
| 5,355,503 | 10/1994 | Soffel et al. | 395/750 |
| 5,371,693 | 12/1994 | Nakazoe | 364/707 |
| 5,390,350 | 2/1995 | Chung et al. | 395/750 |
| 5,454,112 | 9/1995 | Kadono et al. | 395/750 |

FOREIGN PATENT DOCUMENTS

| | | |
|---|---|---|
| 0488384A1 | 11/1991 | European Pat. Off. . |
| 0545828A2 | 12/1992 | European Pat. Off. . |
| 4234150A1 | 10/1992 | Germany . |
| 4355811 | 12/1992 | Japan . |
| WO93/07558 | 4/1993 | WIPO . |

OTHER PUBLICATIONS

Intel386™ SL Microprcessor SuperSet System Design Guide, Chapter 14, "System and Power Management," 1992, pp. 14–1 through 14–7.

PicoPower Technology, Inc., "The PicoPower 'Evergreen,' 486/386DX Portable Computer Core Chip," Preliminary Data Book, Version 1.3.1, Sep. 16, 1992, pp. i through 65.

APPIAN, "P94 PowerMizer™ Power Manager Controller, Advanced Product Description," The New Vision In Systems Solutions, Nov. 1990 pp. 1 though 4 and 6.

Interarc III Platform Designer's Guide, Western Digital, "WD7600LP Chip Set, Interarc III Functionality," Advance Information, Dec. 12, 1990, pp. 8 through 11.

VLSI Technology, Inc., "Advance Information, VL82C322A,"pp. 1-2, 4–15, 21–23, 27–29.

Motorola Semiconductor Technical Data, "8–Bit Microcomputer, LAPKAT MC 68HC05G8," Product Preview (Rev. 1.0), Motorola Inc., 1990, pp. Intro 1–3, APX B–1, A7–1 to A7–3.

*Primary Examiner*—Ayaz R. Sheikh
*Attorney, Agent, or Firm*—Philip T. Virga

[57] ABSTRACT

A desktop computer power controller uses the keyboard controller of the computer to time the duration of keyboard or other input device inactivity and to assert a power control signal when the duration exceeds a predetermined threshold value. A power control unit coupled to the keyboard controller interrupts power to a peripheral device such as a video monitor when the duration of inactivity exceeds the threshold value. In an alternative embodiment, the power control unit switches the peripheral device into a low-power mode when the duration of inactivity exceeds the threshold value. Once in low-power mode, the keyboard controller switches the device back to normal mode upon detecting resumed activity on the keyboard or other input device.

9 Claims, 6 Drawing Sheets

DESKTOP COMPUTER MONITOR POWER CONTROL USING KEYBOARD CONTROLLER

RILATED APPLICATIONS

This application is a continuation of U.S. patent application Ser. No. 08/020,292, filed on Feb. 19, 1993 now abandoned.

BACKGROUND AND FIELD OF THE INVENTION

This invention relates generally to power management for computer systems, and specifically to a system for controlling the power to a video monitor using signals generated by the keyboard controller of the computer.

A wide range of technology has been developed for power management of portable, battery-operated computers. The primary goal of such technology is to reduce battery drain to lengthen the period of time the portable computer can be used before the battery requires recharging.

Far less attention has been given to reducing power consumption of desktop computer systems that rely on a.c. power mains rather than batteries for a source of power. While overall system power consumption must remain below the maximum capacity of the computer's power supply circuitry, there has generally not been any other strong incentive to reduce the power consumption of desktop computer systems.

The United States Environmental Protection Agency (EPA) has recently taken note of the huge waste of power that results from desktop computers that are turned on but are not actively in use. For instance, many computer users leave their computer systems turned on at night, on weekends, and during other periods of prolonged inactivity. In response to this situation, EPA introduced the "Energy Star Computers Program" as an incentive for the computer industry to reduce power consumption of personal computers to 30 watts during periods of inactivity.

A great deal of the technology developed for portable computers can be applied to desktop computers as well to achieve this power reduction goal, but three disadvantages typically arise from application of portable computer power reduction technology to desktop computer systems. Typically, such technology is expensive, so reduction in power consumption is achieved only at significant cost increase. Power-reduction often is achieved through extensive use of the microprocessor of the computer, thus taking away processor capacity for other tasks and requiring a power reduction system that is tailored for a particular computer operating system. Perhaps most importantly, use of portable computer technology in new desktop computers does little, if anything, to address power consumption in the millions of existing desktop computers currently in use, as very little of the portable computer power-reduction technology can be retrofitted to existing desktop computers.

Notably absent from the known power-reduction schemes is a system specifically designed for reducing power consumption of desktop computers that is inexpensive, does not significantly tax scarce processing resources, and can be used with both new and existing desktop computers. Unlike the typical environment in which portable computers are used, in the typical desktop computer environment, external ("peripheral") devices such as color video monitors and laser printers consume far more power than the central processing unit. Therefore, it would be desirable for a desktop computer power-reduction system to control power to such peripheral devices.

SUMMARY OF THE INVENTION

In accordance with the present invention, a system for controlling power to a video monitor or other peripheral device uses a spare pin typically provided on a conventional desktop computer keyboard controller chip to provide a control signal to a power control unit. A timer keeps track of the duration between input activities such as key presses on the computer system keyboard or actuation of a cursor pointing device (e.g., a "mouse"). If the timer indicates inactivity for a duration exceeding a predetermined threshold value, the control signal on the spare keyboard controller pin signals the power control unit to reduce power to the peripheral. In one embodiment, the power control unit is simply a voltage-controlled switch for interrupting power to a video monitor. In an alternate, more elaborate configuration, the power control unit is a circuit capable of placing the video monitor or other peripheral device in a stand-by mode. Very little intervention by the central processing unit of the computer is required for the system to operate, and a system in accordance with the present invention is well-suited to being retrofitted into existing desktop computer systems.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
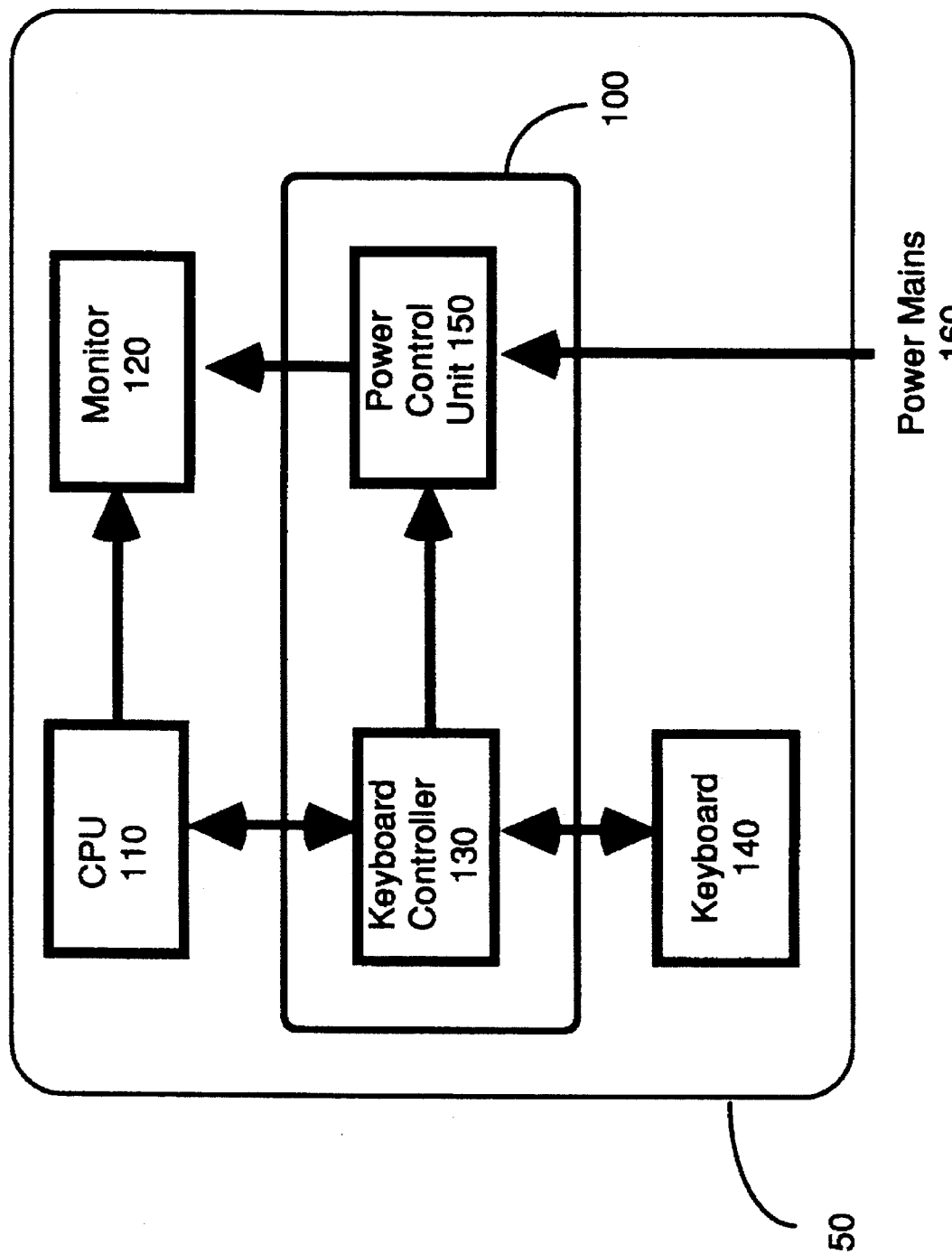
FIG. 1 is a functional block diagram of a monitor power controlling system in accordance with the present invention.

Referring now to FIG. 1, there is shown a functional block diagram of a power controlling system 100 for a computer system 50 in accordance with the above invention. The power controlling system includes a keyboard controller 130 and a power control unit 150. In operation, keyboard controller 130 processes data interchange between keyboard 140 and CPU 110. Although only a keyboard is illustrated in FIG. 1, those skilled in the art will recognize that keyboard controller 130 may also be configured to process data from additional input devices, such as a mouse. Aside from processing keyboard data in a conventional manner, keyboard controller 130 also performs a check, described more fully below, to determine the duration of any periods of input inactivity. During lengthy periods of inactivity, it is desirable to turn off monitor 120, which typically displays data under the direction of CPU 110. Therefore, if inactivity persists beyond a threshold duration, keyboard controller 130 directs power control unit 150 to disconnect monitor 120 from power mains 160.

Figure 2:
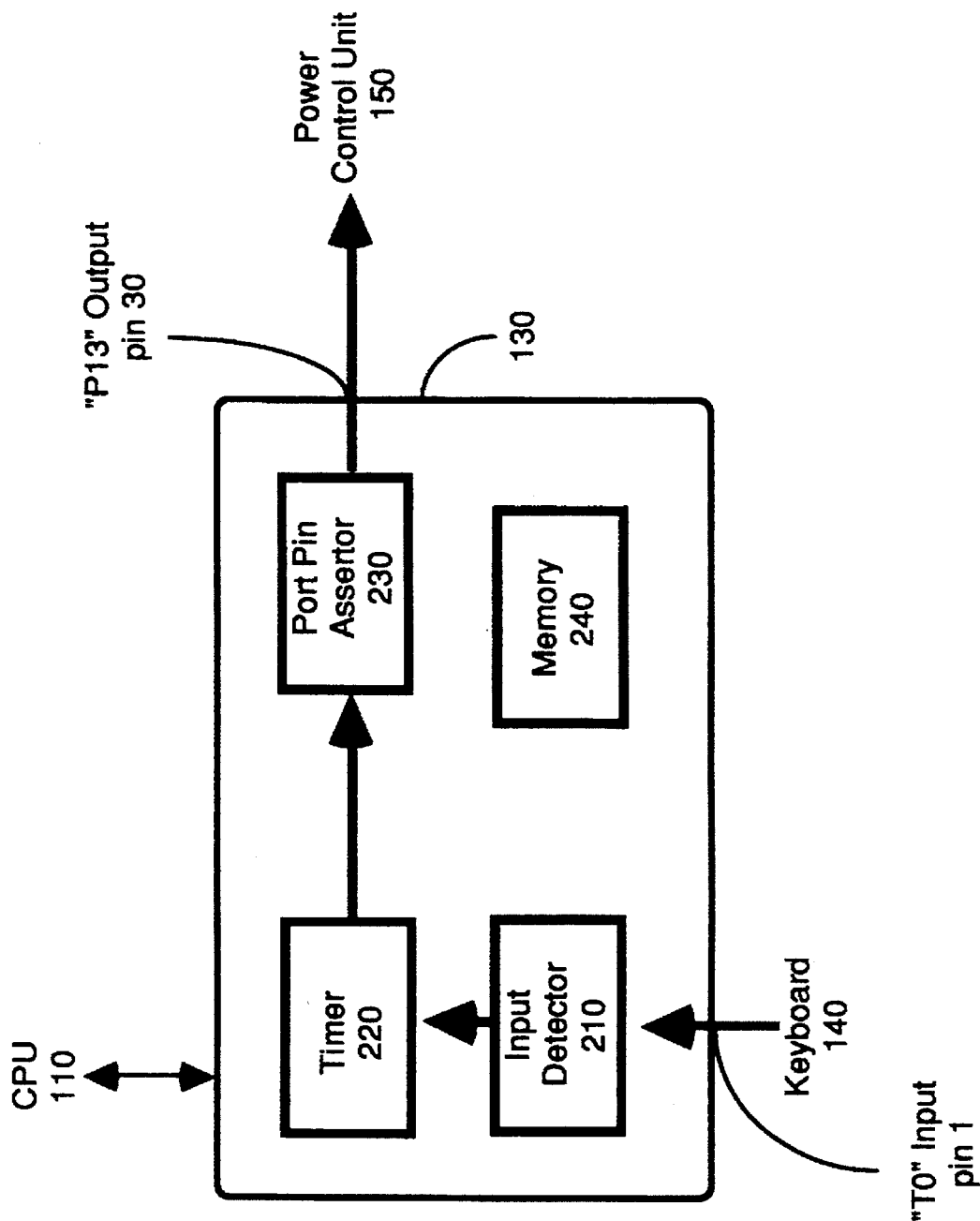
FIG. 2 is a functional block diagram of the keyboard controller illustrated in FIG. 1, in accordance with the present invention.

Referring now to FIG. 2, there is shown a functional block diagram of keyboard controller 130. Physically, keyboard controller 130 may be implemented either as an application-specific integrated circuit, or by using a conventional keyboard controller processor programmed to perform the functions illustrated in FIG. 2. In the preferred embodiment, a conventional keyboard controller processor model 80C42 from INTEL is used to implement keyboard controller 130, but those skilled in the art will recognize that many of the popular keyboard controller processors, such as the model 80C42 from NEC, may alternatively be used to implement keyboard controller 130. Further information regarding such processors may be found in each processor's published technical documentation, for instance the INTEL UPI-C42 Data Sheet.

Functionally, keyboard controller 130 is comprised of three pertinent components: input detector 210, timer 220 and port pin assertor 230. In operation, input detector 210 detects input from keyboard 140 and possibly another input device such as a mouse (not shown). Timer 220 computes the elapsed time between occurrences of input activity as detected by input detector 210. If the duration between input activity occurrences exceeds a threshold value, timer 220 directs port pin assertor 230 to assert a signal on an output pin of keyboard controller 130, which is coupled to power control unit 150. A fourth component, memory 240, is illustrated in FIG. 2 to indicate that the processor instructions directing the operation of input detector 210, timer 220, and port pin assertor 230 are stored in memory 240 associated with keyboard controller 130. In a preferred embodiment, memory 240 is implemented using the conventional internal read-only memory (ROM) of the 80C42 processor storing the general purpose program instructions of the 80C42 processor, along with internal random access memory (RAM) locations storing configuration information such as the identification of the pin to be toggled, desired time-out values, instructions to toggle the pin upon occurrence of a time-out condition, and calibration values to compensate the internal timers of the 80C42 processor for variations in the clock frequency at which the processor is running.

In a preferred embodiment, input detector 210 is implemented by periodically polling the conventional "keyboard clock" line from keyboard 140, which, in a preferred embodiment is typically applied to the "T0" input, or pin number 1, of the 80C42 processor used to implement keyboard controller 130. In some embodiments, input detector 210 also polls the conventional "auxiliary clock" line, applied to the "T1" input, or pin 39, of the 80C42 processor, to detect activity on an auxiliary input device such as a mouse. An assembly-code software routine stored in memory 240 directs the keyboard controller 130 to poll the T1 input, as described in the pseudocode representation below:

```
Main:
    if command received
        call process command;
    else
    if data for keyboard received
        call send_keydata;
    else
    if output buffer empty & keyboard enabled
        enable clock line;
        if keyboard start
            call process key
        else
            if port pin true
                continue
            else
                call inactivity_timer;
    else jmp main;
```

In a preferred embodiment, timer 220 is implemented by the conventional timer/counter hardware of the 80C42 processor, in conjunction with the conventional program instructions stored in the 80C42 internal ROM and configuration values stored in RAM as discussed above. The software routine that directs the keyboard controller 130 to measure a time between successive input activity as detected b,y input detector 210 is described in the pseudocode representation below:

```
Inactivity_Timer:
    if timercounter overflowed
        increment timer register;
        if timer register overflows
            call set_portpin;
            return;
        else
            return;
    else
        return;
```

In a preferred embodiment, port pin assertor 230 is also implemented by a combination of the conventional hardware and program instructions of the 80C42 processor and additional program instructions that direct the keyboard controller 130 to assert a signal on the P13 output, or pin number 30, of the 80C42 processor if timer 220 indicates a duration of inactivity exceeding a predetermined threshold, as described in the pseudocode representation below:

```
Set_portpin:
    set port pin true;
    return;
```

In a preferred embodiment, once timer 220 indicates that a predetermined threshold duration has expired and keyboard controller 130 has asserted a signal based on that period of inactivity, keyboard controller 130 continues to sample for activity. When activity is detected, port pin assertor is directed to reset the signal on the output pin P13 of keyboard controller 130, and the process of inactivity timing described above begins again. The pseudocode representation of this process is as follows:

```
Process_key:
    disable mouse;
    call get_scancode;
    disable keyboard;
```

```
        call reset_portpin;
        output scancode to system;
        reset timer register;
        reset timer/counter hardware;
        return;
Reset_portpin:
        output port pin false;
        return;
Get_scancode:
        read serial scan code;
        return;
```

In a preferred embodiment, the configuration information described above is loaded into the previously described RAM portion of memory 240 by CPU 110, under control of a conventional basic input-output system program, at system start-up. In some embodiments, CPU 110 may provide the user of computer system 50 with an opportunity to alter this configuration information by selecting certain parameters of operation through configuration files or interactive queries on start-up. Thus, the threshold duration of keyboard inactivity may be varied by the user, or the power controlling system 100 may be disabled in certain circumstances, for instance when the computer is being used to display information without the need for user input. A pseudocode representation of one possible controller initialization process is as follows:

```
Init_8042timer:
        output timer command to 8042;
        output timer value to 8042;
        output pin definition data to 8042;
        return;
```

Figure 3A:
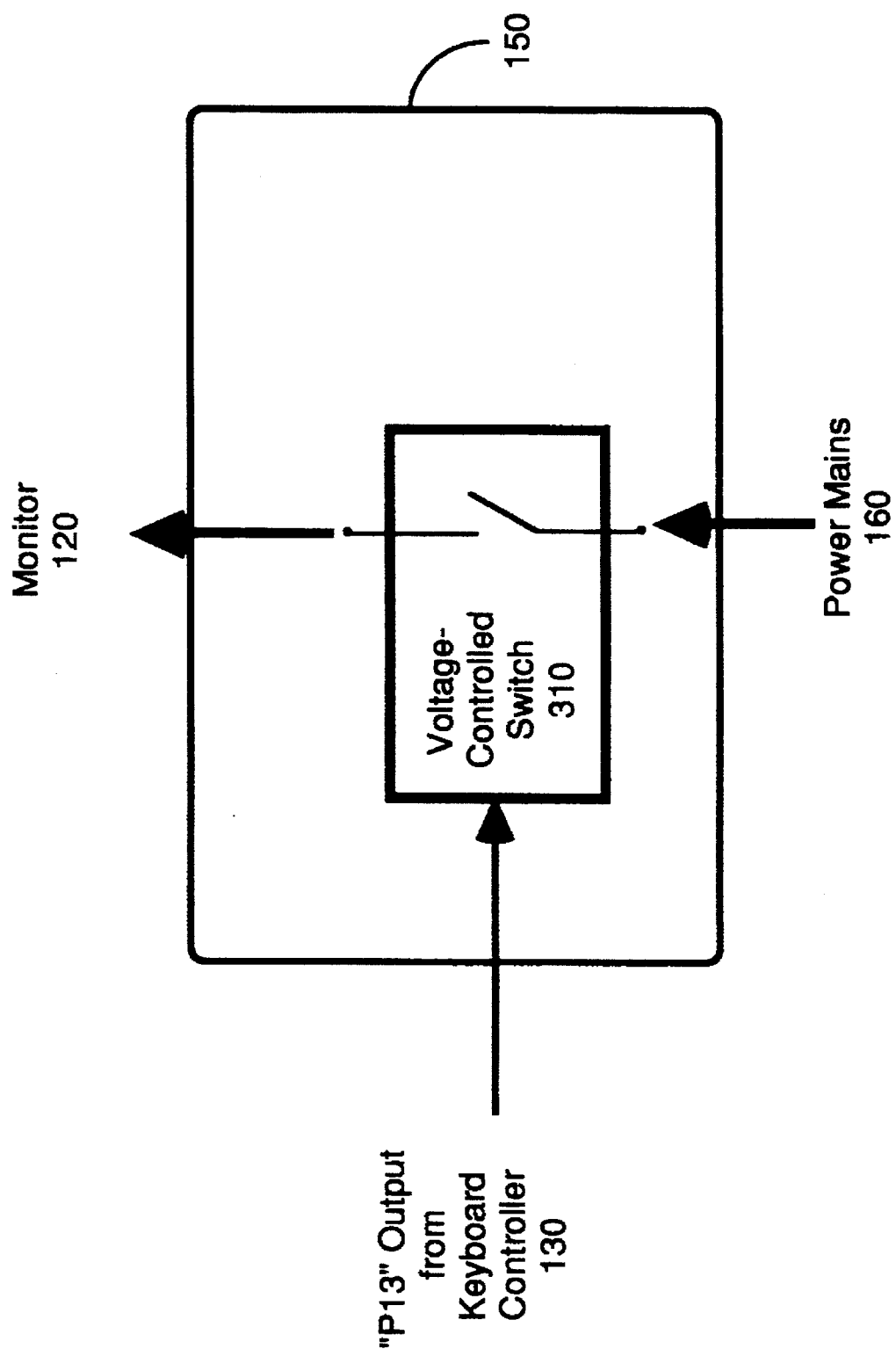
FIGS. 3A–3C are a functional block diagrams of different embodiments of the power control unit illustrated in FIG. 1, in accordance with the present invention.

Referring now to FIG. 3A, there is shown a functional block diagram of power control unit 150. A voltage-controlled switch 310 is inserted between power mains 160 and monitor 120. The P13 output signal from keyboard controller 130 is applied as an input control signal to voltage-controlled switch 310. In operation, when the P13 signal indicates a duration of input inactivity exceeding the predetermined threshold, voltage-controlled switch 310 opens and interrupts power to monitor 120. In the preferred embodiment, voltage-controlled switch 310 is implemented using a model 0AC-5 solid-state relay from CRYDOM.

In a preferred embodiment, power control unit 150 simply interrupts power from power mains 160 to monitor 120. This simple function facilitates retrofitting to virtually any external video monitor. There is no need for any physical change to the overall computer system 50, other than addition of power control unit 150 and a connection between pin 30 of controller 130 and power control unit 150.

Figure 3B:
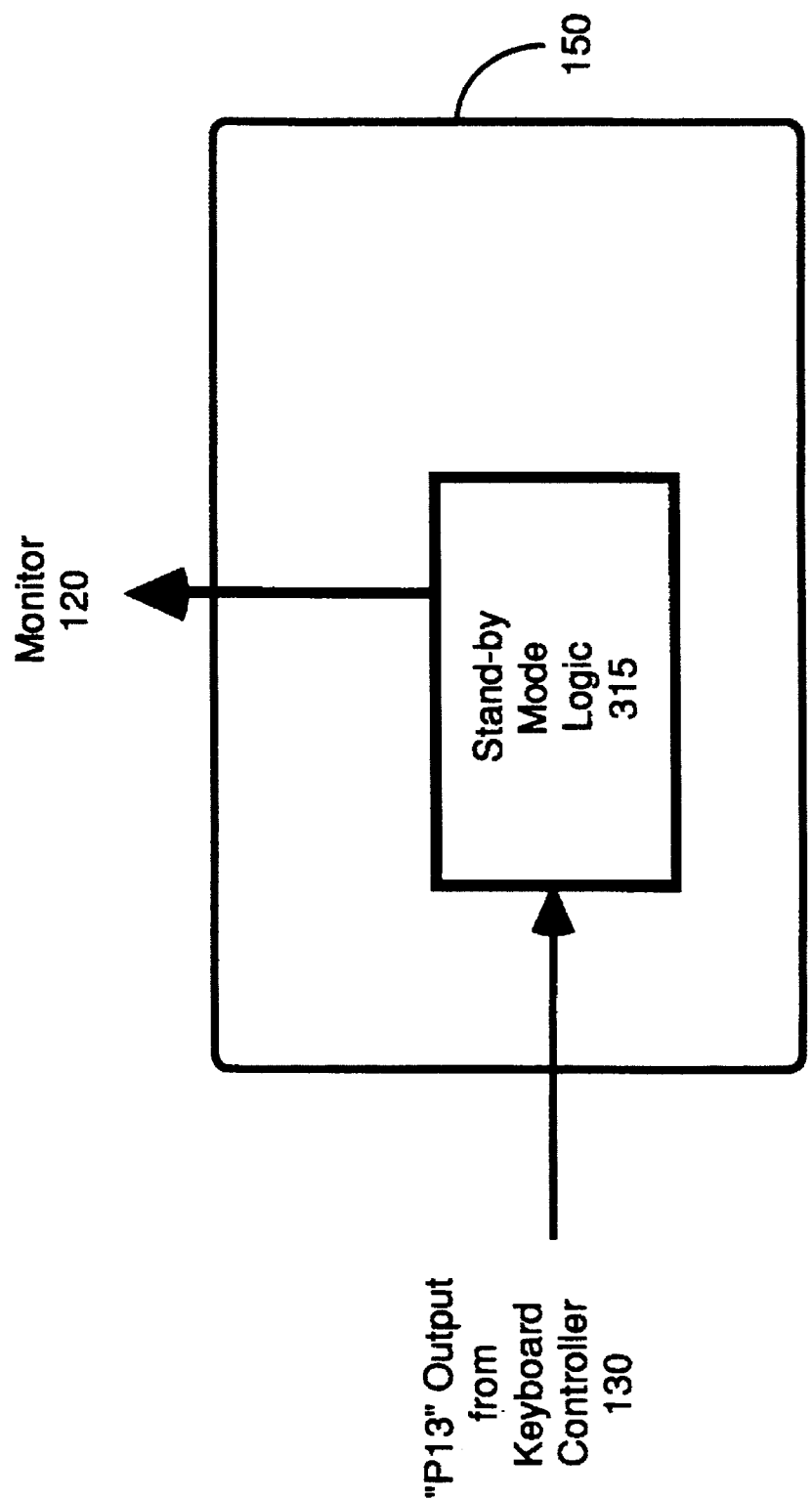

However, more complex power control may also be used in accordance with the present invention. Referring now to FIG. 3B, those skilled in the art will recognize that power control unit 150 and monitor 120 could be readily configured to place monitor 120 in a low-power stand-by mode in which most of the circuitry of monitor 120 is deactivated, with the conventional cathode ray tube heater (not shown) activated at a reduced power level. In such a manner, the monitor 120 when reactivated requires very little warm-up time before it is ready for operation. Thus, the power control unit 150 of FIG. 3B includes stand-by mode logic circuitry 315 to generate signals to bring monitor 120 into and out of such stand-by mode in response to the "P13" output from keyboard controller 130.

In yet another embodiment, the power control unit may be coupled to video controller circuitry (such as a conventional VGA controller card) to provide a signal that will cause the monitor to enter a standby mode under the existing protocols of the video controller circuitry. For example, the well-known VGA computer video standard committee "VESA" has proposed a stand-by state which could be controlled by power control unit 150 using techniques that are well-known to those skilled in the art. In this case, the stand-by mode logic circuitry 315 of FIG. 3B would be coupled to video controller circuitry resident either in monitor 120 or, more conventionally, in CPU 110.

Figure 3C:
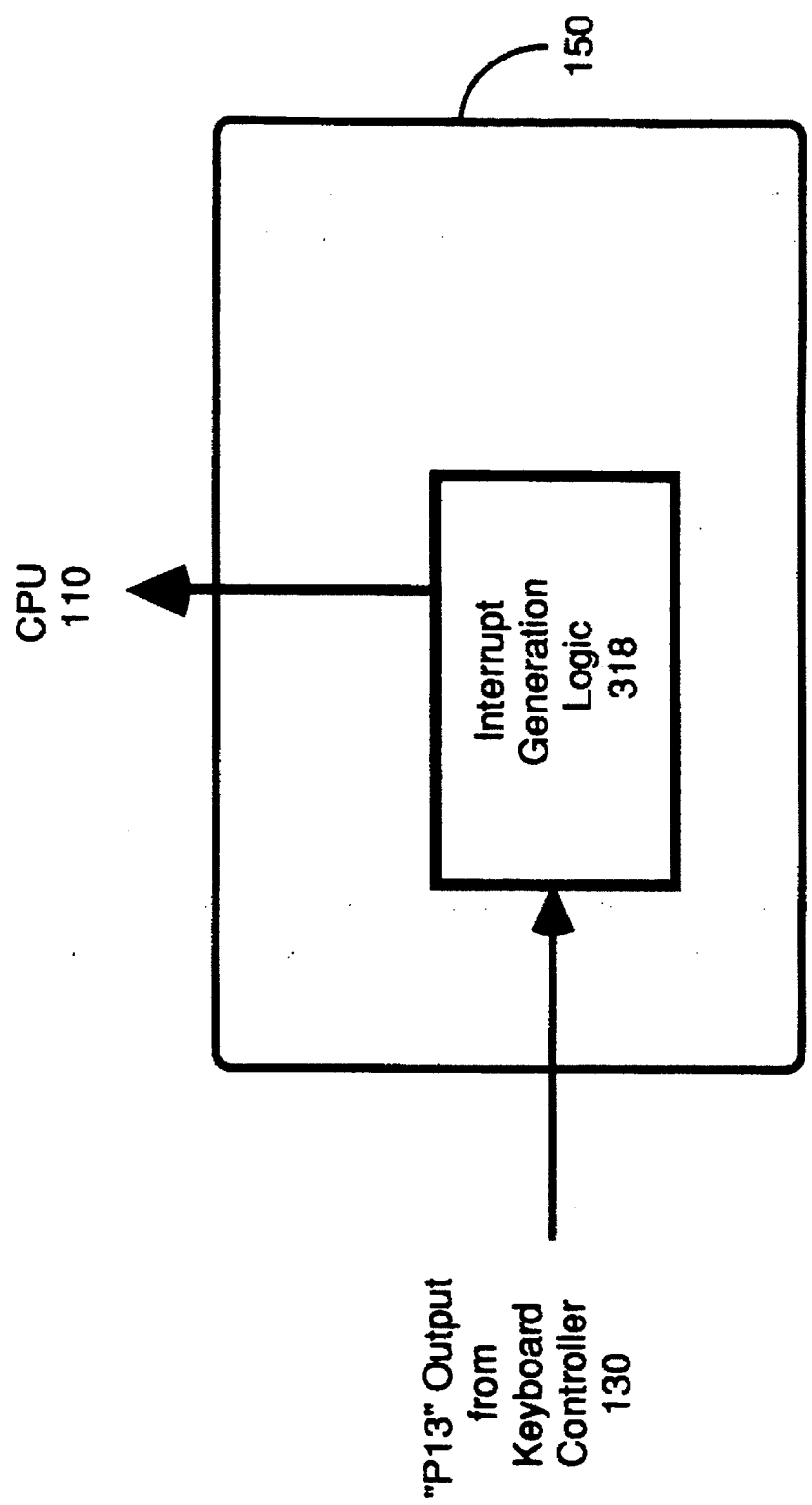

Referring now to FIG. 3C, in still another embodiment, power control unit 150 may include interrupt generation logic 318 that is coupled to interrupt circuitry of CPU 110 to cause a system interrupt to occur once prolonged keyboard inactivity is detected, as indicated by the "P13" output from keyboard controller 130. In one possible implementation, a system management interrupt (SMI) signal may be generated to cause CPU 110 to issue any of a variety of desired commands. For example, if monitor 120 uses more power when displaying white pixels thorn when displaying black pixels, CPU 110 might simply send all black pixels to, monitor 120. In another yet possible embodiment, CPU 110 might disable the generation of synchronization signals to the monitor if this will result in a power-saving mode. Furthermore, CPU 110 might, upon this SMI signal, issue conventional commands directing that other peripheral devices such as disk drives switch off or to a low power mode. Even though use of SMI signals in this embodiment does require some use of CPU 110, that use of CPU 110 does not include the task of continuing to check for input activity.

Figure 4:
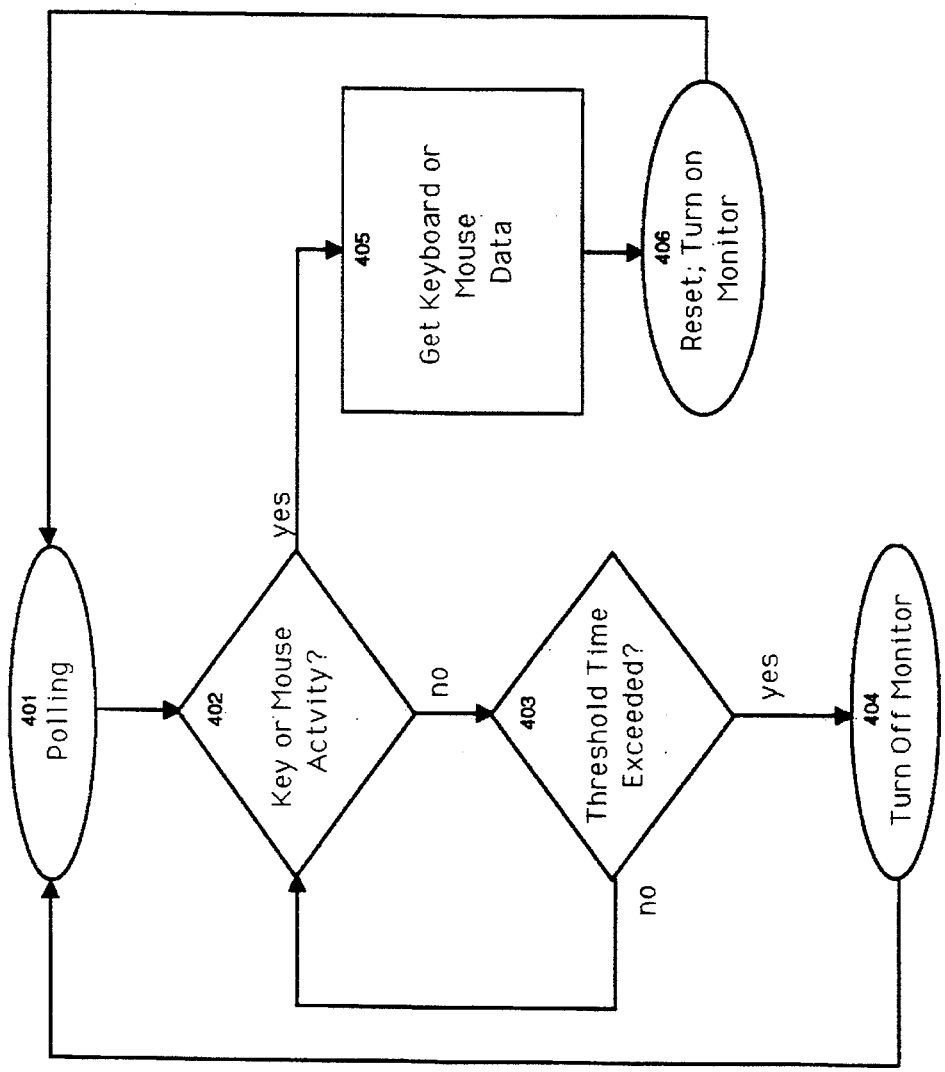
FIG. 4 is a flow diagram of power controlling system operation, in accordance with the present invention.

Referring now also to FIG. 4, there is shown a flow diagram of the overall operation of a power controlling system 100 in accordance with the present invention. Operation begins at step 401, with the keyboard controller 130 initiating polling of the keyboard 140 and possibly other input devices for activity. Once polling is initiated in step 401, step 402 routes operation to step 405 if there is keyboard or other input device activity, and to step 403 if no activity is detected. In step 403, a check is made to see whether a predetermined threshold time has been exceeded. In a preferred embodiment, the threshold time is typically set at 20 minutes, but the threshold may easily be reconfigured for other values as described above. If no activity is detected, operation returns to step 402 for subsequent checking of keyboard or other input device activity. If the threshold time has been exceeded, then operation moves from step 403 to step 404, at which point the monitor 120 is turned off, and operation returns to step 401. If keyboard or other input device activity is detected in step 402, operation moves to step 405, where the keyboard controller 130 obtains the data from the keyboard 140 or other input device, turns on monitor 120 if it is not already on, and resets operation to step 401.

As mentioned above, the power control function of the present invention need not be applied only to video monitors. Another possible application is to control power to laser printers, the heaters for which typically require significant power. Those skilled in the art will recognize application of the present invention to other peripheral devices such as scanners, facsimile devices, modems, and the like.

From the above description, it will be apparent that the invention disclosed herein provides a novel and advantageous system and method of reducing power consumption of desktop computer systems. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for controlling power to a peripheral device associated with a computer, the computer including a central processing unit and an input device in addition to the peripheral device, the system comprising:

an input device controller having a port pin, the input device controller monitoring a time duration of inactivity of said input device and producing, without intervention by said central processing unit, a signal on said port pin responsive to said time duration of inactivity of said input device exceeding a predetermined threshold value; and power control means coupled to said port pin and to said peripheral device for controlling power to said peripheral device responsive to said signal on said port pin without intervention by said central processing unit.

2. A system as in claim 1, wherein said input device controller further comprises:

an input detector coupled to said input device for detecting activity thereon;

a timer coupled to said input detector for determining said duration of inactivity; and a port pin assertor coupled to said timer for producing said signal on said port pin responsive to said duration exceeding said threshold value.

3. A system as in claim 1, wherein said power control means comprises a signal-activated switch configured to interrupt power to a power supply coupled to said peripheral device.

4. A system as in claim 1, wherein said power control means comprises a circuit configured to cause said peripheral device to attain a power-saving stand-by mode.

5. A system as in claim 1, wherein said power control means comprises a circuit configured to generate an interrupt signal in said computer.

6. A system as in claim 1, wherein said input device is a keyboard and said input device controller is a keyboard controller.

7. A method of controlling power to a peripheral device associated with a computer, the computer including a central processing unit, an input device and an input device controller in addition to the peripheral device, the method comprising the steps of:

sensing occurrences of input device activity using said input device controller;

timing an interval between successive said occurrences of input device activity, using said input device controller;

producing a signal on said input device controller, without intervention by said central processing unit, responsive to said interval between successive said occurrences of input device activity exceeding a predetermined threshold value; and selectively controlling power to said peripheral device, without intervention by said central processing unit, responsive to said signal on said input device controller indicating said interval between successive said occurrences of input device activity exceeding said predetermined threshold value.

8. A method as in claim 7, wherein said step of selectively controlling power comprises the step of disconnecting power to said peripheral device responsive to said signal on said input device controller.

9. A method as in claim 7, wherein said step of selectively controlling power comprises the step of placing said peripheral device in a low-power mode responsive to said signal on said input device controller.

* * * * *